March 3, 1931. J. M. SIMPSON 1,794,738
TRANSMISSION GEARING
Filed Aug. 9, 1926
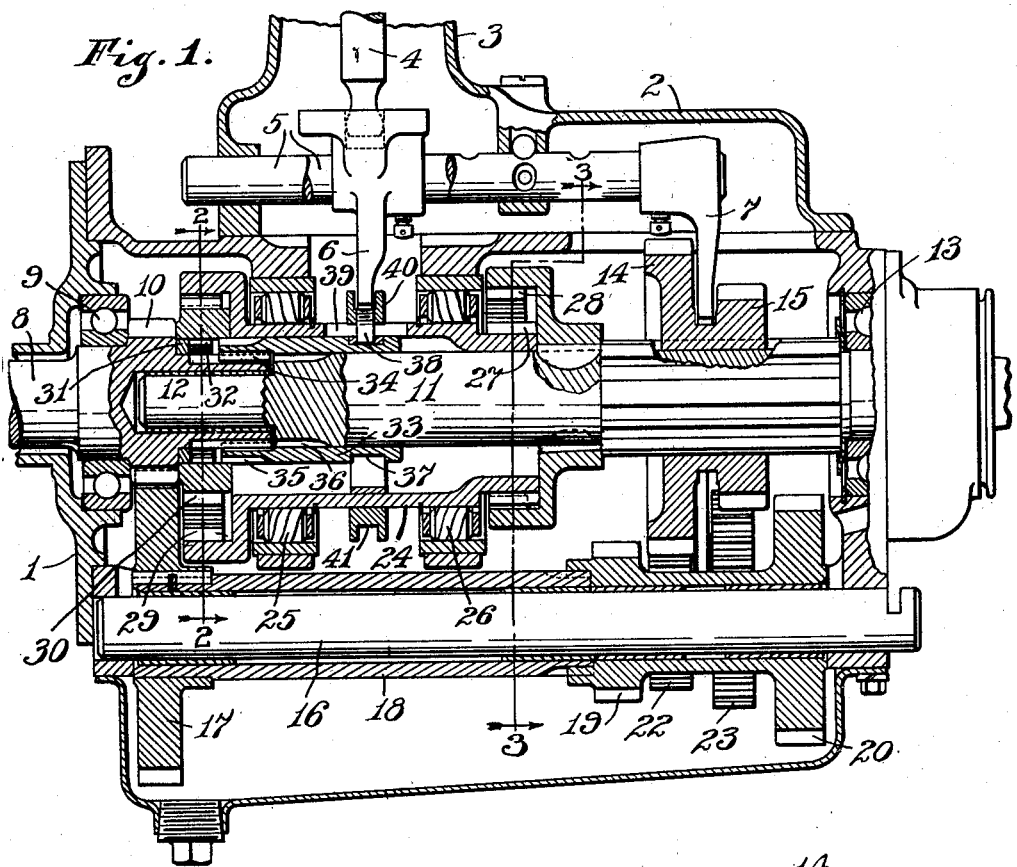
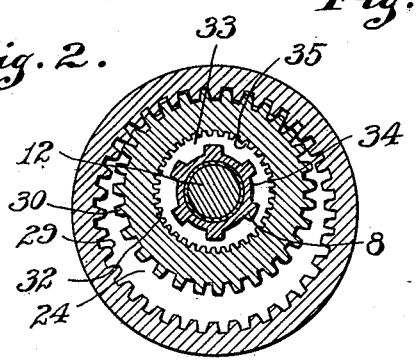
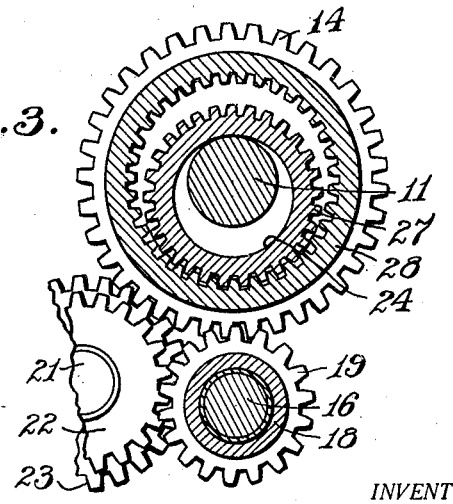
INVENTOR.
John M. Simpson,
BY
Hood + Hahn
ATTORNEYS Patented Mar. 3, 1931

1,794,738

UNITED STATES PATENT OFFICE

JOHN M. SIMPSON, OF MUNCIE, INDIANA

TRANSMISSION GEARING

Application filed August 9, 1926. Serial No. 128,033.

My invention relates to improvements in transmission gearing and particularly to gearing for automobiles.

In certain types of such transmissions there is provided a gearing train to provide one or more speed changes including an eccentrically mounted external and internal gear and mechanism whereby the driving and driven shafts may be connected directly, or through the external and internal gear. In addition to the above speed changing gearing there is frequently provided additional speed changing gearing. It is one of the objects of the present invention to provide means whereby said external and internal speed changing gears may remain idle with respect to the driving shaft during the period when the driven shaft is directly connected to the driving shaft or when the additional speed changing mechanism is in operation.

For the purpose of disclosing my invention I have illustrated one embodiment thereof in the accompanying drawings in which;

Fig. 1 is a longitudinal section of an automobile transmission embodying my invention;

Fig. 2 is a transverse section taken on the line 2—2 of Fig. 1, and

Fig. 3 is a transverse section taken on the line 3—3 of Fig. 1.

In the embodiment illustrated I provide a transmission casing 1 which may be of any suitable type having a top 2 provided with a cone support 3 in which is mounted for universal movement a shifting lever 4 adapted to operate sliding rods 5 provided with the usual shifting forks 6 and 7.

The driving shaft 8 which is adapted to be connected with the engine or power unit through the usual clutch member extends into the casing and has one end journaled in suitable ball bearings 9 arranged in the front wall of the casing. This driving shaft is provided at its inner end within the casing with a driving gear 10 either formed directly on the shaft or rigidly connected therewith. The driven shaft 11 extends into the casing, having its forward end 12 bearing in the recessed end of the driving shaft 8 and being mounted in suitable ball bearings 13 at the rear end of the casing. This driven shaft at its rear end is provided with a pair of speed changing gears 14 and 15 mounted on the same hub and varying in diameter and splined on the shaft.

A counter-shaft 16 is mounted in the lower part of the casing 1 and has rotatably mounted thereon a gear 17 adapted to mesh with the driving gear 10. This gear is drivingly mounted on a sleeve 18 drivingly connected at its opposite end with the common hub of a pair of gears 19 and 20 of different diameter and adapted to respectively mesh with the gears 14 and 15 to obtain variations in the speed at which the driven shaft 11 is operated.

Also mounted in the lower portion of the casing is a jack shaft 21 having mounted thereon a pair of gears 22 and 23 adapted to respectively mesh with the gears 19 and the gear 14 for driving the driven shaft in a reverse direction. Surrounding the adjacent ends of the driving shaft 8 and the driven shaft 11 is a hub 24 eccentrically mounted with respect to the axes of the driving and driven shafts in a pair of spaced apart roller bearings 25 and 26 supported by and within the casing 1. This hub carried at one end an external gear 27 adapted to mesh with an internal gear 28 fixed on the driven shaft 11. The opposite end of the hub is provided with a relatively large diameter internal gear 29 adapted to mesh with an external gear 30 revolubly mounted on the end of the driving shaft 8, it being spaced apart from the shaft by a bearing ring 31 and provided on its inner face with a series of dental clutch teeth 32. This gear 30 is adapted to be drivingly clutched with the driving shaft 8 by means of a clutch member comprising a sleeve 33 surrounding the driven shaft 11 and overhanging the end of the driving shaft 8. The portion of the sleeve over-hanging the driving shaft 8 is internally splined as at 34 with the end of the driving shaft 8 and is provided on its periphery with a series of dental clutch teeth 35 adapted when the sleeve is moved to the left, looking at Fig. 1, to mesh with the dental clutch teeth 32 of the gear 30 and thereby lock the gear 30 to the driving shaft whereby the driven shaft will be operated by the driving shaft through the gear 30, the gear 29, the gear 27 and the gear 28, the diameter of these gears being such that the driven shaft 11 will be rotated at a lower speed than that of the driving shaft 8. The internal splines on the sleeve 33 when the sleeve is moved to the right, looking at Fig. 1, are adapted to mesh with external splines 36 on the end of the driven shaft whereby the two shafts will be directly connected and at the same time the gear 30 will be disconnected from the driving shaft so that with this connection the driven shaft will be driven directly from the driving shaft and at the same speed as the driving shaft.

In order that the sleeve 33 may be shifted longitudinally along the shafts as above described the rear end of this sleeve is provided with an annular groove 37 into which take a series of lateral pins 38 extending through longitudinal slots 39 in the hub 24 and screw threaded into an annular collar 40 surrounding the hub 24 and provided with an annular groove 41 into which takes the shifting fork 6.

The above construction provides a means whereby three speeds may be obtained, low, second and direct, for the driven shaft and in addition thereto a fourth speed, which fourth speed is obtained through an eccentric internal and external driving gear connection and the arrangement is such that when the driven shaft is operated at its first, second and direct speeds the eccentric fourth speed gearing may remain idle with respect to the driving shaft.

I claim as my invention:

1. In combination, in a gearing having a driving and a driven shaft, speed changing gears arranged to connect the driven shaft with said driving shaft in changed speed relation, an external gear on one of said shafts, an internal gear on the other shaft, a hollow eccentrically mounted gear member for connecting said external and internal gears, in surrounding relation to said shafts, and having sets of external and internal teeth in mesh with the external and internal gears respectively and means for drivingly disconnecting the gear on the driving shaft therefrom whereby the eccentrically mounted gear member may be drivingly disconnected from said driving shaft during the operation of the driven shaft by said first mentioned set of speed changing gears.

2. In combination, in a gearing having a driving and a driven shaft, speed changing gears arranged to connect the driven shaft with the driving shaft in changed speed relation, an external gear on one of said shafts, an internal gear on the other of said shafts, a hollow eccentrically mounted gear member for connecting said external and internal gears, in surrounding relation to said shafts, and having sets of external and internal teeth in mesh with the external and internal gears respectively, the gear on the driving shaft being drivingly idle with respect thereto and a clutch member which when in one position connects said gear with the shaft and in another position connects the two shafts directly.

3. In combination, in a gearing having a driving and a driven shaft, speed changing gears arranged to connect the driven shaft with the driving shaft in changed speed relation, an external gear on one of said shafts, an internal gear on the other of said shafts, a hollow eccentrically mounted gear member for connecting said external and internal gears, in surrounding relation to said shafts, and having sets of external and internal teeth in mesh with the external and internal gears respectively, the gear on the driving shaft being drivingly idle with respect thereto and a clutch member having a neutral position, a position for connecting said gear with the driving shaft and a position for directly connecting said shafts.

4. In combination, a casing, a driving and a driven shaft extending thereinto, speed changing gears within said casing arranged to connect the driven shaft with the driving shaft in changed speed relation, an external gear on one of said shafts, an internal gear on the other shaft, a hollow eccentrically mounted gear member for connecting said external and internal gears, in surrounding relation to said shafts and having sets of external and internal teeth in mesh with the external and internal gears respectively, rolling bearings externally of said gear member and rigidly supported by the casing and means for drivingly connecting and disconnecting the gear on said driving shaft with said shaft.

5. In combination, a casing, a driving and a driven shaft extending thereinto, speed changing gears arranged to connect the driven shaft with said driving shaft in changed speed relation, an external gear on one of said shafts, an internal gear on the other of said shafts, a hollow eccentrically mounted gear member for connecting said external and internal gears, in surrounding relation to said shafts, and having sets of external and internal teeth longitudinally spaced apart on said member and in mesh with the external and internal gears respectively, spaced apart rolling bearings externally of said gear member and rigidly supported by said casing adjacent the respective external and internal teeth and means for drivingly connecting the gear on said driving shaft with said shaft.

6. In combination, in a gearing having a driving and a driven shaft, speed changing gears arranged to connect the driven shaft with said driving shaft in changed speed relation, an external gear on one of said shafts, an internal gear on the other shaft, a hollow eccentrically mounted gear member for connecting said external and internal gears, in surrounding relation to said shafts, and having sets of external and internal teeth in mesh with the external and internal gears respectively, the gear on the driving shaft being drivingly idle with respect thereto, a clutch within said hollow gear member for drivingly connecting said gear with the driving shaft, said hollow eccentric member having longitudinal slots therein and means external of said member extending through said slots for operating said clutch.

7. In combination, in a gearing having a driving and a driven shaft, speed changing gears arranged to connect the driven shaft with the driving shaft in changed speed relation, an external gear rotatably mounted on said driving shaft and having inwardly projecting dental clutch teeth, an internal gear mounted on said driven shaft, a hollow eccentrically mounted gear member for connecting said external and internal gears, in surrounding relation to said shafts, and having sets of external and internal teeth in mesh with the external and internal gears respectively, a sleeve surrounding said shafts having internal splines engaging splines on said driving shaft and provided on its periphery with dental clutch members arranged to engage the dental clutch teeth of the external gear on said driving shaft, said driven shaft having teeth arranged to be engaged by the splines of said sleeve and means exteriorly of said eccentric gear member and extending through longitudinal slots in said gear member for longitudinally adjusting said sleeve.

8. In combination, in a gearing having a driving and a driven shaft, an external gear on one of said shafts, an internal gear on the other shaft, the gear on the driving shaft being normally drivingly disconnected therefrom, a hollow eccentrically mounted gear member for connecting said external and internal gears and having sets of external and internal teeth in mesh with the internal and external gears respectively, longitudinally shiftable means with the said gear member for drivingly connecting the gear on the driving shaft with the driving shaft, longitudinally shiftable means connected to said clutching means and rotatably disconnected therefrom radially extending through slots in said gear member for operating said shiftable means and means exterior of the hub member arranged to be engaged by the operating mechanism and connected with said radially extended means.

9. In combination, a gearing having a driving and a driven shaft, an external gear on one of said shafts, an internal gear on the other shaft, a hollow eccentrically mounted gear member for connecting said external and internal gears and having sets of internal and external teeth in mesh with the external and internal gears respectively, a longitudinally shiftable clutch member mounted within said gear member for effecting a direct drive of the driven shaft from the drive shaft or a drive through the gear train and means for shifting said clutch member including an annular ring operating in a groove in said clutch member, an annular ring mounted externally of said gear member and means extending through longitudinally extending slots in said gear member for connecting said rings.

10. In combination, a gearing having a driving and a driven shaft, an external gear on one of said shafts, an internal gear on the other shaft, a hollow eccentrically mounted gear member for connecting said external and internal gears and having sets of external and internal teeth in mesh with the internal and external gears respectively, a longitudinally shiftable clutch member mounted within said gear member, a longitudinally shiftable operating member on the exterior of said gear member rotatably mounted therewith for effecting a direct drive of the driven shaft from the drive shaft or through the gear train and connecting means connecting said shiftable operating member with the clutch member and arranged to permit a relative rotation between the clutch member and said connecting means and extending through longitudinally extending slots in the gear member.

11. In combination, a gearing having a driving and a driven shaft, an external gear on one of said shafts, an internal gear on the other shaft, a hollow eccentrically mounted gear member for connecting the external and internal gears and having sets of external and internal teeth in mesh with the internal and external gears respectively, a longitudinally shiftable clutch member mounted within said gear member for effecting a direct drive of the driven shaft from the drive shaft or the gear train, a ring mounted on said clutch member in a groove in said clutch member which permits a relative rotative movement between the same, radially extending fingers connected to said ring and projecting through longitudinally extending slots in the gear member, and a second ring mounted on said gear member and operatively connected with said fingers and means for shifting said second ring longitudinally.

12. In a transmission of the character described, a drive shaft, a driven shaft, a sleeve rotatably mounted about the drive shaft eccentric thereto and provided with an internal gear, a pinion loose on the drive shaft and meshing with the internal gear on the eccentric sleeve, a gear ratio driving connection between the sleeve and the driven shaft, and means for clutching the pinion to the drive shaft or for clutching the driven shaft to the drive shaft for direct drive, optionally.

13. In a transmission of the character described, a drive shaft, a sleeve rotatably mounted about the drive shaft and having an internal gear, a pinion loose on the shaft and meshing with said gear, a driven shaft, driving connections between the sleeve and the driven shaft, and means within the sleeve for clutching the pinion to the drive shaft or for clutching the two shafts together for direct drive, optionally.

In witness whereof I, JOHN M. SIMPSON, have hereunto set my hand at Muncie, Indiana, this 29th day of June, A. D. one thousand nine hundred and twenty-six.

JOHN M. SIMPSON.